(12) United States Patent
Chen et al.

(10) Patent No.: US 7,673,111 B2
(45) Date of Patent: Mar. 2, 2010

(54) MEMORY SYSTEM WITH BOTH SINGLE AND CONSOLIDATED COMMANDS

(75) Inventors: Shelley Chen, Hillsboro, OR (US); Randy B. Osborne, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 191 days.

(21) Appl. No.: 11/318,028

(22) Filed: Dec. 23, 2005

(65) Prior Publication Data

US 2007/0150687 A1 Jun. 28, 2007

(51) Int. Cl.
*G06F 12/00* (2006.01)
*G06F 13/00* (2006.01)
*G06F 13/28* (2006.01)

(52) U.S. Cl. .................. 711/168; 711/105; 711/154; 711/167

(58) Field of Classification Search .................. 711/168
See application file for complete search history.

(56) References Cited

U.S. PATENT DOCUMENTS

| | | | |
|---|---|---|---|
| 4,924,381 A | 5/1990 | Tokumme | |
| 5,948,081 A | 9/1999 | Foster | |
| 5,991,819 A | 11/1999 | Young | |
| 6,023,745 A | 2/2000 | Lu | |
| 6,098,133 A | 8/2000 | Summers et al. | |
| 6,273,759 B1 | 8/2001 | Perino et al. | |
| 6,304,133 B1 | 10/2001 | Sato | |
| 6,430,683 B1 | 8/2002 | Arimilli et al. | |
| 6,470,433 B1 | 10/2002 | Prouty et al. | |
| 6,615,326 B1 | 9/2003 | Lin | |
| 6,674,648 B2 | 1/2004 | McCall et al. | |
| 6,766,385 B2 | 7/2004 | Dodd et al. | |
| 6,785,190 B1 | 8/2004 | Bains et al. | |
| 6,831,924 B1 | 12/2004 | Cornett et al. | |
| 6,877,071 B2 | 4/2005 | Sherman | |
| 6,954,822 B2 | 10/2005 | Bains et al. | |
| 6,961,831 B2 | 11/2005 | Ware et al. | |
| 7,024,518 B2 | 4/2006 | Halbert et al. | |

(Continued)

FOREIGN PATENT DOCUMENTS

| EP | 1241580 | 9/2002 |
|---|---|---|
| WO | WO-00/34875 | 6/2000 |

OTHER PUBLICATIONS

PCT/US2006/047148 "42P22937PCT International Search Report and Written Opinion mailed Apr. 20, 2007".

(Continued)

*Primary Examiner*—Kevin L Ellis
*Assistant Examiner*—Ryan Bertram
(74) *Attorney, Agent, or Firm*—Derek J. Reynolds

(57) ABSTRACT

In some embodiments, a chip includes a request queue to include write requests, and scheduling circuitry to schedule commands including commands in response to the write requests. The chip also includes mode selection circuitry to monitor the request queue and in response thereto to select a first or a second mode for the scheduling circuitry, wherein in the first mode the scheduling circuitry schedules certain commands as separate single commands and in the second mode the scheduling circuitry schedules consolidated commands to represent more than one separate single command. Other embodiments are described.

22 Claims, 5 Drawing Sheets

U.S. PATENT DOCUMENTS

| | | |
|---|---|---|
| 7,043,599 B1 | 5/2006 | Ware et al. |
| 2002/0023191 A1 | 2/2002 | Fudeyasu |
| 2003/0217223 A1* | 11/2003 | Nino et al. .................. 711/105 |
| 2004/0236921 A1 | 11/2004 | Bains |
| 2005/0071536 A1 | 3/2005 | Osborne |
| 2005/0071541 A1 | 3/2005 | Osborne |
| 2005/0091460 A1 | 4/2005 | Rotithor et al. |
| 2005/0108469 A1 | 5/2005 | Freeman et al. |
| 2005/0144375 A1 | 6/2005 | Bains et al. |
| 2006/0190669 A1* | 8/2006 | Lee et al. ....................... 711/4 |

OTHER PUBLICATIONS

Office Action mailed Apr. 29, 2008 for corresponding U.S. Appl. No. 11/491,312, filed Jul. 21, 2006, to Randy Osborne et al.

Response to Office Action mailed Apr. 29, 2008 for corresponding U.S. Appl. No. 11/491,312, filed Jul. 21, 2006, to Randy Osborne et al., response dated Jul. 28, 2008.

* cited by examiner

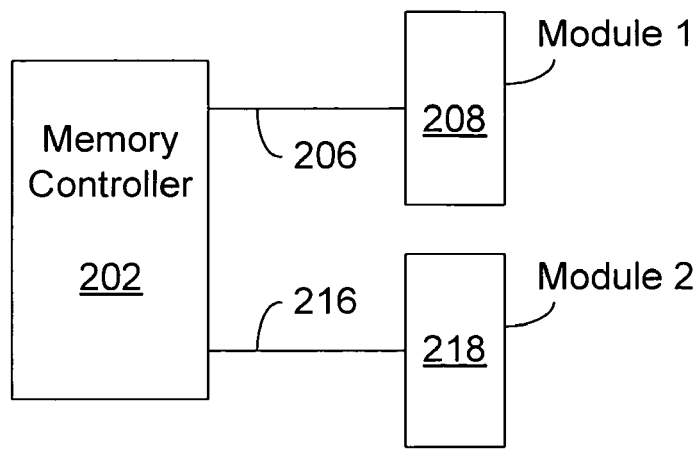
FIG. 11
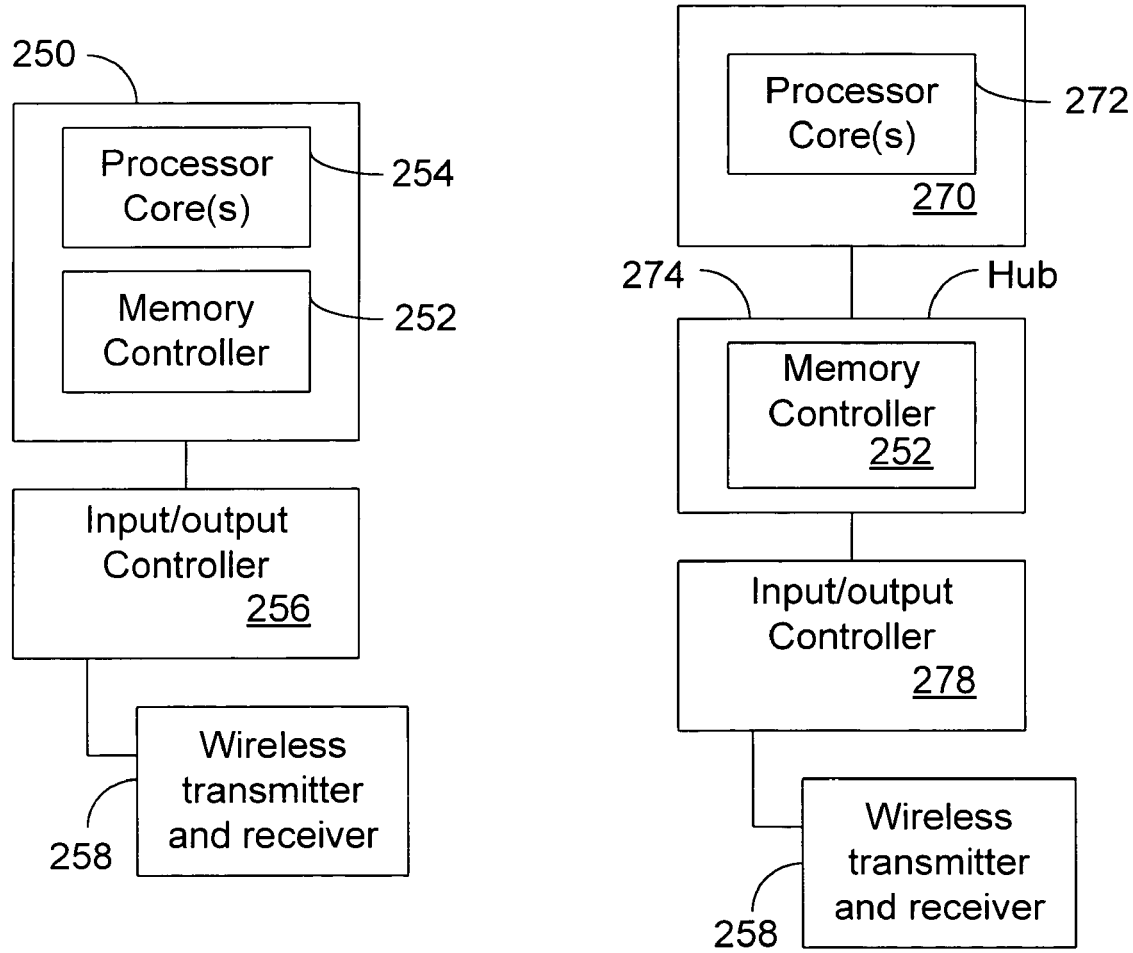
FIG. 12
FIG. 13

MEMORY SYSTEM WITH BOTH SINGLE AND CONSOLIDATED COMMANDS

BACKGROUND

1. Technical Field

Embodiments of the inventions relate to memory systems in which a memory controller dynamically changes between a first mode in which the memory controller provides certain commands as separate single commands and a second mode in which the memory controller provides a consolidated command that represents the single commands.

2. Background Art

Various arrangements for memory devices in a memory system have been proposed. For example, in a typical synchronous dynamic random access memory (SDRAM) system, memory devices communicate data through bidirectional data buses and receive commands and addresses through command and addresses buses. The memory devices have stubs that connect to the buses in a multi-drop configuration (coupling three or more points). Other designs include point-to-point signaling (coupling two points). The point-to-point signaling may be unidirectional or bidirectional. The signaling may be single ended or differential. In some systems, address, command, and write data may be on the same conductors.

Memory controllers provide various commands to memory devices. These commands include an activate command (ACT), a precharge command (PRE), a read command (RD), and a write command (WR). Read and write commands are sometimes called CAS commands.

Memory modules include a substrate on which a number of memory devices are placed. The memory devices may be placed on only one side of the substrate or on both sides of the substrate. In some systems, a buffer is also placed on the substrate. For at least some signals, the buffer interfaces between the memory controller (or another buffer) and the memory devices on the module. In such a buffered system, the memory controller can use different signaling with the buffer than the buffer uses with the memory devices. A dual in-line memory module (DIMM) is an example of a memory module. Multiple modules may be in series and/or parallel. A system may include one or more than one memory channel.

Some computer systems having included some memory devices on a motherboard and other memory devices on a memory module or other card in a connector on the motherboard.

In some memory systems, the memory devices receive signals and repeat them to other memory devices as well as provide requested data signals to next memory devices. Read data signals can be provided to the memory controller through a point-to-point unidirectional return link from the last memory device in a series of memory devices in a looped fashion or from a memory device that is not the last memory device in the series.

Memory controllers have been used in chipset hubs and in a chip that includes a processor core. Some computer systems include wireless transmitter and receiver circuits.

BRIEF DESCRIPTION OF THE DRAWINGS

The inventions will be understood more fully from the detailed description given below and from the accompanying drawings of embodiments of the inventions which, however, should not be taken to limit the inventions to the specific embodiments described, but are for explanation and understanding only.

FIGS. 9-13 are each a block diagram representation of a system according to some embodiments of the inventions.

DETAILED DESCRIPTION

Figure 1:
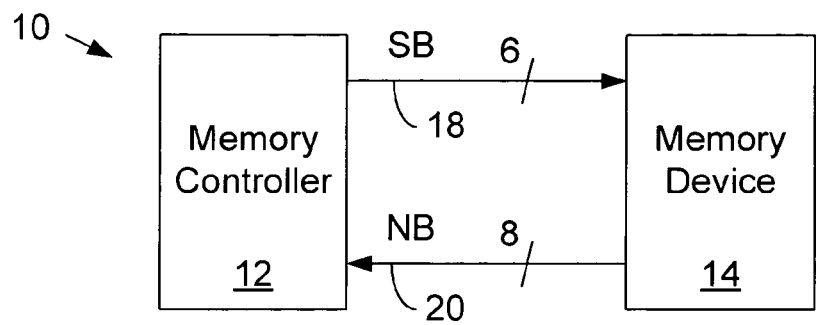
FIG. 1 is a block diagram representation of a system including a memory controller and a memory device according to some embodiments of the inventions.

Referring to FIG. 1, a system 10 includes a memory controller 12 and a memory device 14. In the particular embodiments of FIG. 1, signals are carried from memory controller 12 to memory device 14 through a unidirectional point-to-point link 18, and from memory device 14 to memory controller 12 through a unidirectional point-to-point link 20. In some embodiments, the signals on link 18 include command, address, and write data signals and the signals on link 20 are read data. As examples, link 18 includes six conductor lanes and link 20 includes eight conductor lanes, each of which may have one conductor or two conductors with differential signaling. As a convention, signals from memory controller 12 to memory device 14 are said to be south bound (SB) and signals from memory device 14 to memory controller 12 are said to be north bound (NB), but this convention is not required. Memory device 12 may be a DRAM or other type of memory device.

Some different embodiments of memory controller 12 provide different commands to memory device 14. These commands include single commands (a single activate command (ACT), a precharge command (PRE), a single read command (RD), a single write command (WR)) and consolidated commands (a consolidated activate/read command (ACT/RD) and a consolidated activate/write command (ACT/WR). Read and write commands are sometimes referred to as CAS commands. Accordingly, the ACT/RD and ACT/WR commands can be more generally referred to as ACT/CAS commands. There may be additional commands.

In the example of FIG. 1, a reason why more lanes are dedicated to read data than the command, address, write data is that it is desirable to keep the total number of lanes below a particular number and most applications tend to be more read intensive than write intensive. However, in some cases, the available bandwidth (BW) for the SB link 18 can be severely limited. A way to free up capacity for link 18 is to provide consolidated commands.

An advantage of single commands is that they are more likely to be optimally scheduled. (In this context, "optimal" does not necessarily mean a mathematical optimum, but means at least generally close to a mathematical optimum.) In some embodiments, with just in time (JIT) scheduling, the command order can be determined at a later time or even the latest possible time, resulting in an optimal schedule. In addition, with JIT scheduling, there may be more flexibility in scheduling around memory device core timing constraints. Unfortunately, a potential downside to having these single commands is that command traffic on link 18 may be increased, thus decreasing the available write data BW and, in some cases, accentuating the write BW limitation problem.

To help with this problem, scheduling circuitry 32 may schedule single commands when write data traffic will not be particularly high and schedule consolidate commands when write data traffic will be particularly high.

Figure 2:
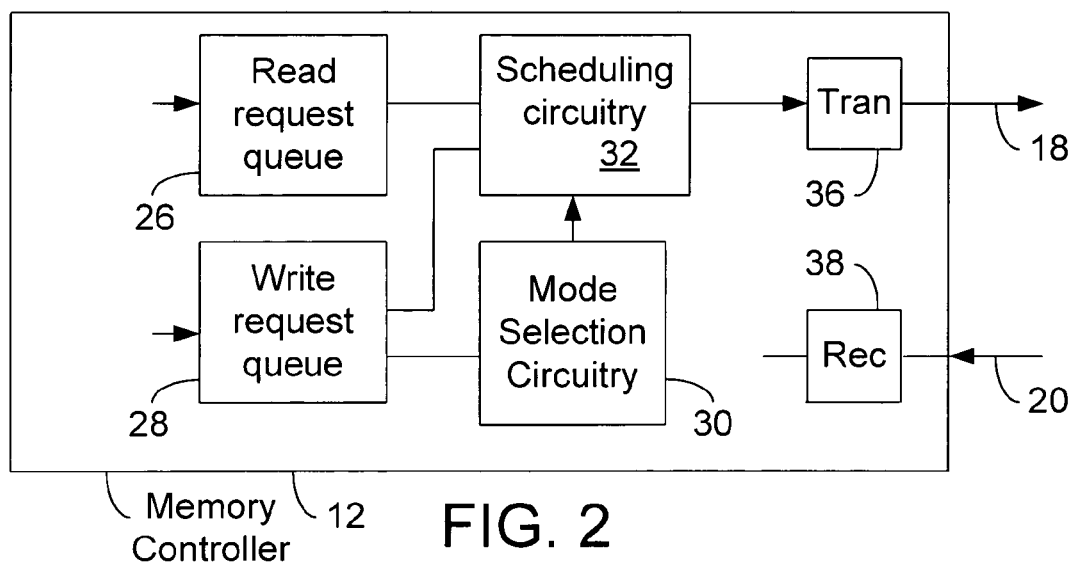
FIG. 2 is a block diagram representation of some details of the memory controller of FIG. 1 according to some embodiments of the inventions.

FIG. 2 illustrates some details that are included in some embodiments of memory controller 12, but the inventions are not limited to these details. FIG. 12 includes a read request queue 26 and a write request queue 28. Read requests from read request queue 26 and write requests from write request queues 28 are provided to scheduling circuitry 32 which may schedule read and write commands for memory device 14 in response to these requests. Command state selection circuitry 30 decides whether scheduling circuitry 32 should be in the first or second mode based at least in part on an analysis of write request queue 28. In the first mode, scheduling circuitry 32 schedules activate and read commands as separate single commands, and activate and write commands as separate single commands. In the second mode, scheduling circuitry 32 schedules corresponding consolidated activate/read and activate/write commands. Commands scheduled by scheduling circuitry 32 are provided by transmitters 36 to link 18. Memory controller 12 also includes receivers 38 to receive signals on link 20. Memory controller 12 includes additional circuitry not illustrated in FIG. 2.

Figure 3:
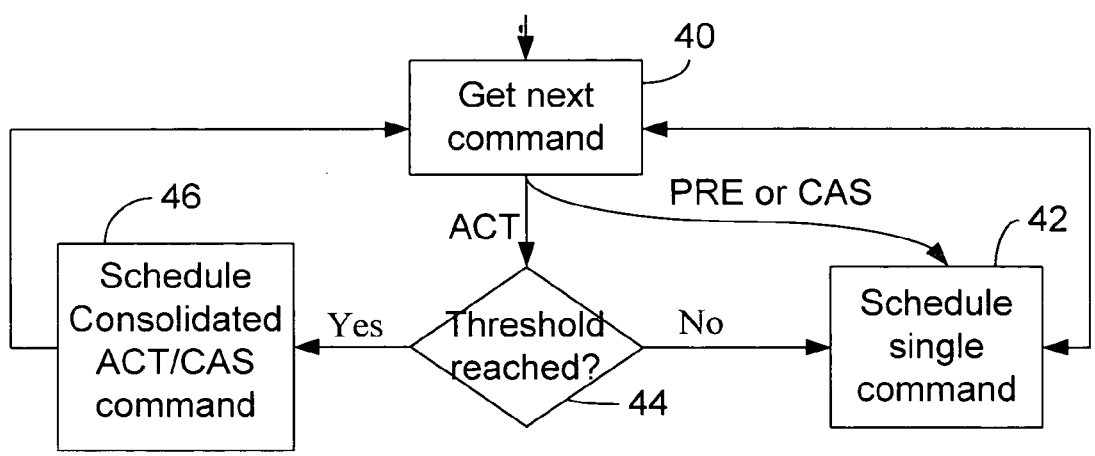
FIG. 3 is a flow chart illustrating some aspects of some embodiments of the inventions.

FIG. 3 is a flow chart illustrating some aspects of memory controller 12 in some embodiments. In other embodiments, memory controller 12 may operate somewhat differently. Referring to FIG. 3, scheduling circuitry 32 considers the next command to schedule (box 40). If the next command is a precharge command, or a CAS command (read or write) with a page hit, then scheduling circuitry 32 schedules the precharge, read, or write command as a single command.

If the next command to consider is an activate command, it means that a read or write command will following. In that case, if memory controller 12 is in the first mode, scheduling circuitry 32 schedules the activate as a single command (box 42) and if memory controller 12 is in the second mode, scheduling circuitry 32 schedules the activate as part of a consolidated command (ACT/RD or ACT/WR) (box 46). Decision box 44 represents the decision as to whether to place memory controller 12 in the first or second mode.

Mode selection circuitry 30 decides whether scheduling circuitry 32 is to be in the first or second mode. There are various ways in which mode selection circuitry 30 can make this determination. One way is to set a threshold amount regarding the fullness of write request queue. The threshold could be a number of write requests in write request queue 28. In some embodiments, if the number of write requests in write request queue 28 has a first relationship to the threshold, then mode selection circuitry 30 has scheduling circuitry 32 be in the first mode. If the number of write requests in queue 28 has a second relationship to the threshold, then mode selection circuitry 30 has memory controller 12 be in the second mode. In some embodiments, the first relationship is less than and the second relationship is greater than or equal to. In other embodiments, the first relationship is less than or equal to and the second relationship is greater than. However, the inventions are not limited to comparing the actual number of write requests with a threshold.

Mode selection circuitry 30 may use other approaches in deciding which mode memory controller 12 should be in. For example, mode selection circuitry 30 could monitor the number of queue spaces that are not occupied with a valid write request, rather than the number of spaces that are occupied. In such a case, the first and second relationships would be different. Still other approaches could be used. For example, if there is more than one type of write request, mode selection circuitry 30 could give different wait to different instructions. For example, in some embodiments mode selection circuitry 30 could weight write requests differently depending on whether they will involve a page miss or page hit. Again, there can be one or two thresholds with a weighted system. In some embodiments, mode selection circuitry 30 might consider other factors such as the heat of memory device 14 in deciding the mode. In some embodiments, scheduling circuitry 32 is in the first mode as a default condition.

The number of write request may rapidly go above and below a threshold. In some embodiments, there is more than one threshold. For example, there may be one threshold to switch from the first to the second mode and another threshold to switch from the second to the first mode.

Figure 4:
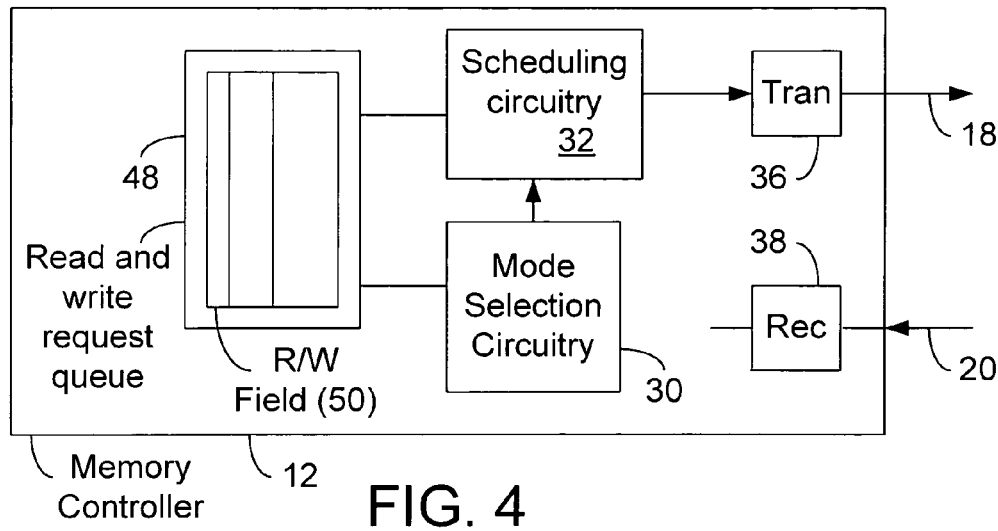
FIG. 4 is a block diagram representation of some details of the memory controller of FIG. 1 according to some embodiments of the inventions.

FIG. 4 is like FIG. 2 except that there is a combined read and write request queue 48 that includes a read/write field 50. In these embodiments, mode selection circuitry 30 may consider how many write requests are in queue 48 based on the contents of field 50 for valid entries in queue 48. Other approaches may be used.

Figure 5:
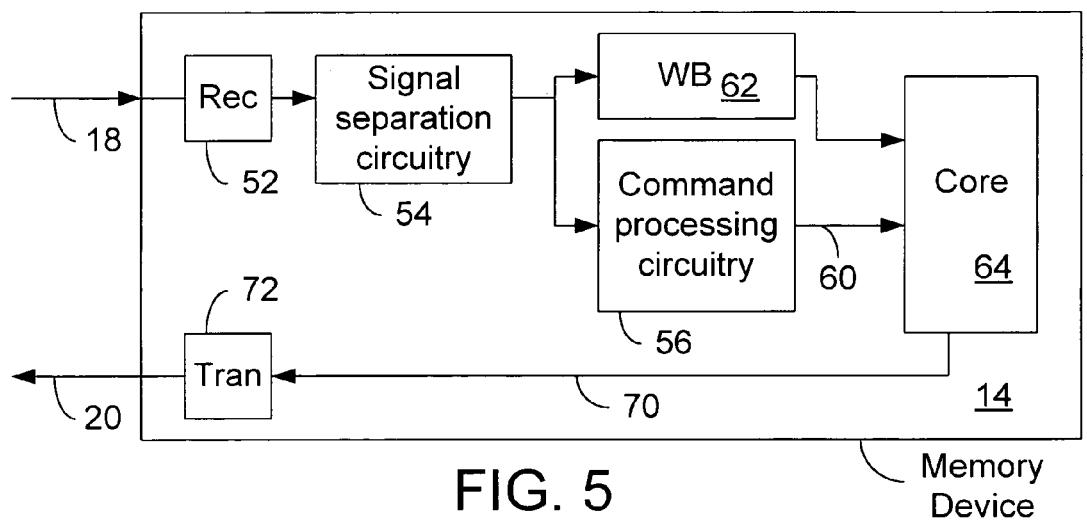
FIG. 5 is a block diagram representation of some details of the memory device of FIG. 1 according to some embodiments of the inventions.

FIG. 5 illustrates details of memory device 14 according to some embodiments, although the inventions are not limited to these details. In FIG. 5, signals from link 18 are received by receivers 52 and provided to signal separation circuitry 54. Write data are provided to write buffer 62 and commands are provided to command processing circuitry 56. Write buffer 62 may be used as follows. In some protocols, for a write request, the write data are first provided. A write command and address are thereafter provided. The write data stays in write buffer 62 until an associated command and address causes it to be written into core 64 (or repeated to a next memory device (see FIG. 9)). Core 64 may include multiple banks and various other circuitry such as decoders. Decoders may also be included before core 64. Some embodiments do not include a write buffer to hold write data in this manner.

Core 64 returns read data to internal data link 70. Transmitters 72 receive read data from link 70 and provide it to external link 20.

Figure 6:
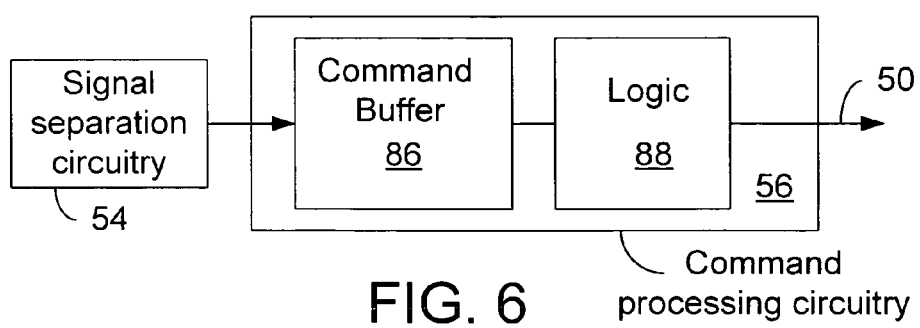
FIG. 6 is a block diagram representation of some details of a portion of FIG. 5 according to some embodiments of the inventions.

FIG. 6 shows additional details of some embodiments of command processing circuitry 56, but in other embodiments, the circuitry is different and additional circuitry may be included in the embodiments of FIG. 6. In FIG. 6, command processing circuitry 56 includes a command buffer 86 to hold commands and logic 88 to determine whether the command is a consolidated command and, if so, which single commands to translate it into.

Figure 7:
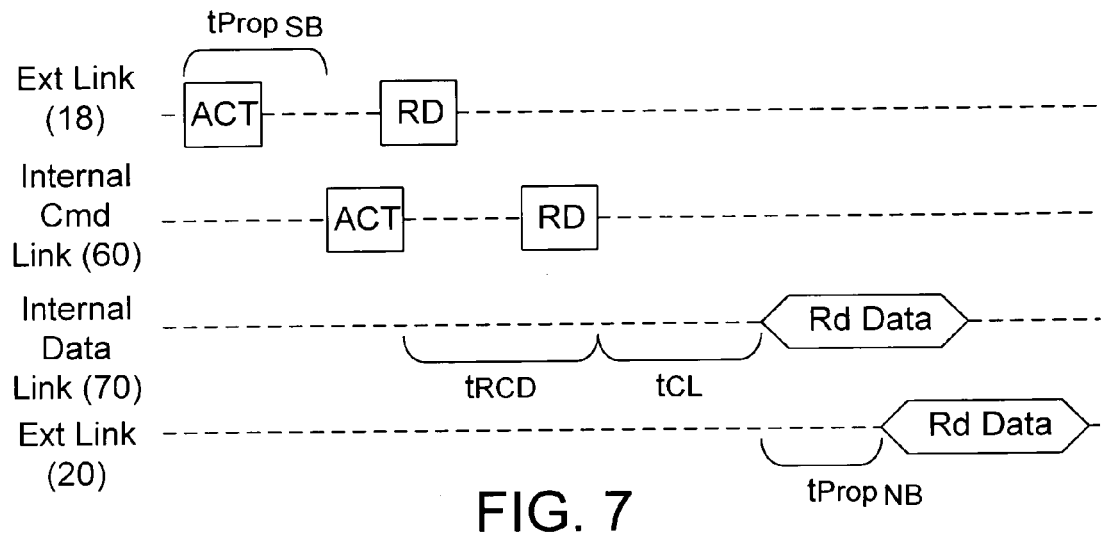
FIGS. 7 and 8 are each a timing diagram illustrating some aspects of some embodiments of the inventions.
Figure 8:
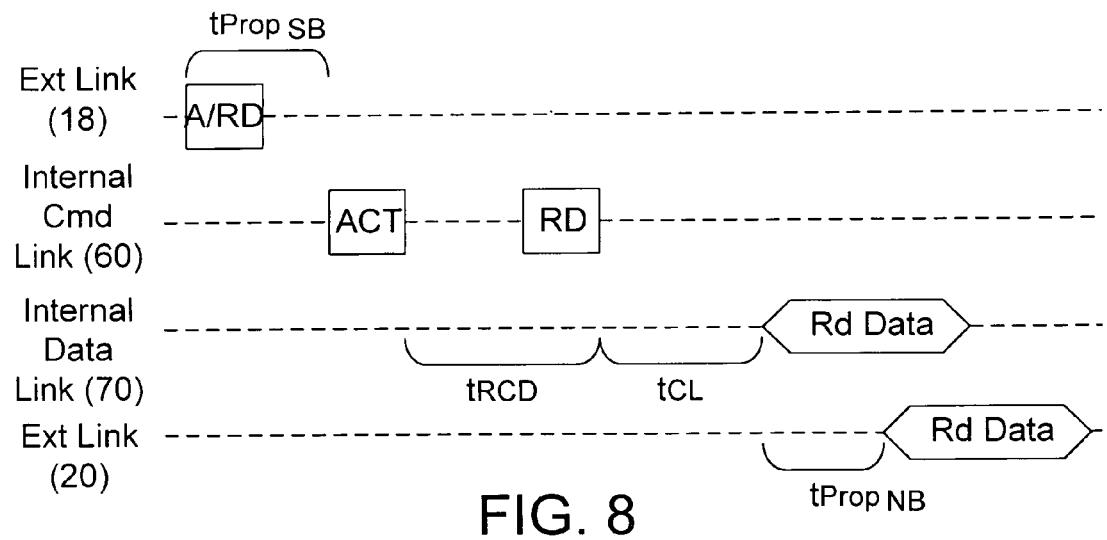

Referring again to FIG. 5, if a particular received command is a single activate, a single read command, or a single write command, then command processing circuitry 56 provides the particular command to core 64 as a single command. However, if the read or write command is a consolidated command, then command processing circuitry 56 translates the consolidated command into two single commands to be provided to core 64. FIGS. 7 and 8 provides examples of these, but the inventions are not limited to the details of FIGS. 7 and 8.

FIG. 7 illustrates the case in which two single commands (ACT and RD) are provided on external link 18. A time tPropSB later they are provided to internal command link 60. Because they are two single commands, command processing circuitry 56 passes them through. A time tRCD is the minimum amount of time between an Activate and a Read command. A time tCL is the time between core 64 receiving a read command and the time the read data are put on internal data link 70. A time tpropNB is the time from when the read data are put on internal data link 70 to the time they are received by memory controller 12 through external data link 20. Note that the relative lengths of tRCD, tCL, tpropNB, the commands, and read data were chosen for convenience in creating FIG. 7 and are not intended to be accurate.

FIG. 8 illustrates the case in which a consolidated command ACT/RD is provided on external link 18. Command processing circuitry 56 translates consolidated command ACT/RD into two single commands ACT and RD and provides them to internal data link 60. The read data are then provided by core 64 to internal link 70 as in FIG. 7.

In some embodiments, each separate command of FIG. 7 occupies one command frame. In some embodiments, any command frame not occupied by a command may have write data scheduled into it.

In addition to providing more available frames on link 18, proper use of consolidated commands may reduce the overall input/output power of the memory device. However, as mentioned, using consolidated commands can result in sub-optimal scheduling, which in turn can result in more commands being scheduled. The problem arises when the ACT and CAS commands are scheduled at the same time on link 18. The ACT command part is still scheduled JIT, but the CAS part is scheduled tRCD prior to when it would have been scheduled with JIT scheduling. By the time tRCD clocks have passed, scheduling the CAS may not be optimal anymore. The sub-optimal schedule can actually increase the number of command as opposed to decreasing it. For example, for a non-optimal schedule, more page misses may occur, which would result in more commands. This would, in turn, restrict write bandwidth even more. In addition, in some embodiments, the ACT and CAS must be received at least tRCD apart. Thus, with these constraints, the only way to schedule the ACT is if the memory controller can schedule both the ACT at one time and the CAS at least tRCD later. Scheduling two commands at a time is less likely to be optimal than scheduling just one command.

The demand-based scheduler described herein can switch between scheduling single commands and consolidated commands. In some embodiments, the demand may be based on the amount of write BW needed by the currently running workload, which may be determined by the instantaneous depth of the write request queue. When the write BW surpasses a certain threshold, the memory controller may begin scheduling consolidated commands. Otherwise, it will schedule only single commands. Thus, for read intensive applications, the needed write BW will be very low and the depth of the write request queue will be small, so the scheduler may schedule single commands. However, for write-intensive applications where the system is usually write BW limited with single commands, the write request queue will tend to become full, and the memory controller will begin consolidating commands attempting to allow for higher write BW.

The adaptive consolidation scheduling protocol may allow taking advantage of the power and command BW savings provided by consolidated commands without leaving as much performance on the table. If only the consolidated commands are scheduled, then performance may be reduced because consolidated commands are less likely to be optimally scheduled. If only single commands are scheduled, then performance may be reduced because of potential limited write BW. The adaptive consolidation algorithm attempts to resolve both of these shortcomings by only consolidating based of the measured or predicted write BW.

The addresses for the commands of FIGS. 7 and 8 may be provided in packets with the commands or they may be provided separately. Write data may be provided in packets with the commands, although that is not required. If write data are provided in packets with commands, the command is not necessarily for that write data.

The operation of the memory device 14 with single or consolidated write commands is similar to that of FIGS. 7 and 8 except that read data are not provided from core 64 in response to a write command and, in some embodiments, the write data are provided to write buffer 62 before the associated write commands are provided.

Figure 9:
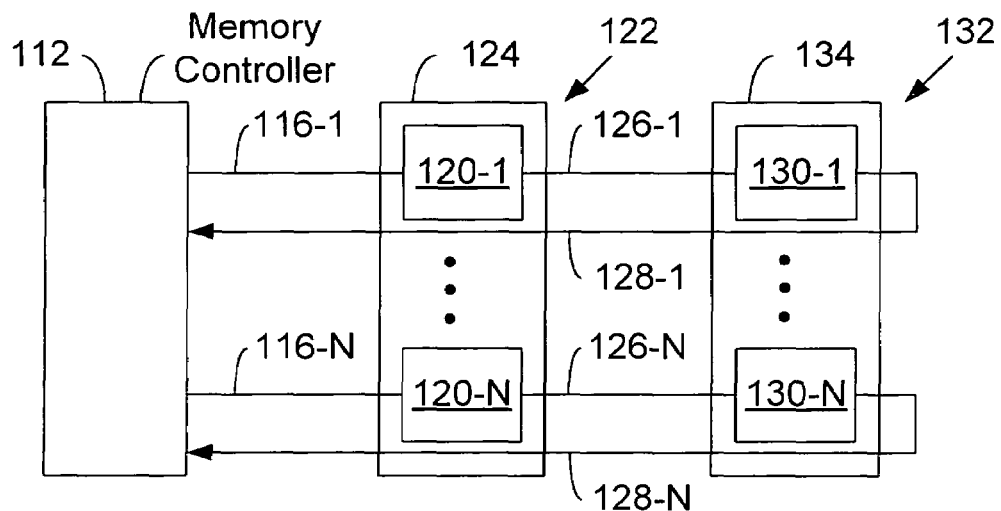

Memory controller 12 and memory device 14 may be provided in a variety of systems. Each memory device may be a separate chip or more than one memory device may be included in a chip. Referring to FIG. 9, memory controller 112 may be identical to or different than memory controller 12. Memory devices 120-1 . . . 120-N may be identical to or different than memory device 14. In some embodiments, memory devices 120-1 . . . 120-N are each separate chips included on a substrate 124 of a memory module 122. The chips may be included on one side or each side of substrate 124. Memory devices 130-1 . . . 130-N are on a substrate 134 of a memory module 132. Conductors 116-1 . . . 116-N carry various signals between memory controller 112 and memory devices 120-1 . . . 120-N. Conductors 126-1 . . . 126-N carry various signals between memory devices 120-1 . . . 120-N and memory devices 130-1 . . . 130-N. In some embodiments, conductors 128-1 . . . 128-N provides signals from memory devices 130-1 . . . 130-N to memory controller 12 in a looped fashion, but this not required. There may be additional conductors that are not illustrated.

In some embodiments, conductors 116-1 . . . 116-N and 126-1 . . . 126-N include unidirectional conductors in each direction (like in FIG. 1) and, in other embodiments, they include only unidirectional conductors with signals in a direction away from memory controller 112. In other embodiments, they include some bidirectional conductors. Signals can be sent from memory controller 112 to memory devices 120-1 . . . 120-N and then repeated by memory devices 120-1 . . . 120-N to memory devices 130-1 . . . 130-N. Each of conductors 116-1 . . . 116-N, 126-1 . . . 126-N, and 128-1 . . . 128-N include multiple lanes, which may be one or two conductors each. In other some embodiments, instead of memory devices 120-1 . . . 120-N being on a substrate of a memory module, they are on the motherboard. In this case, substrate 124 could represent the motherboard, rather than the substrate of a memory module. Where FIG. 9 or the other figures shows a single memory device, there may be a chain of memory devices.

Figure 10:
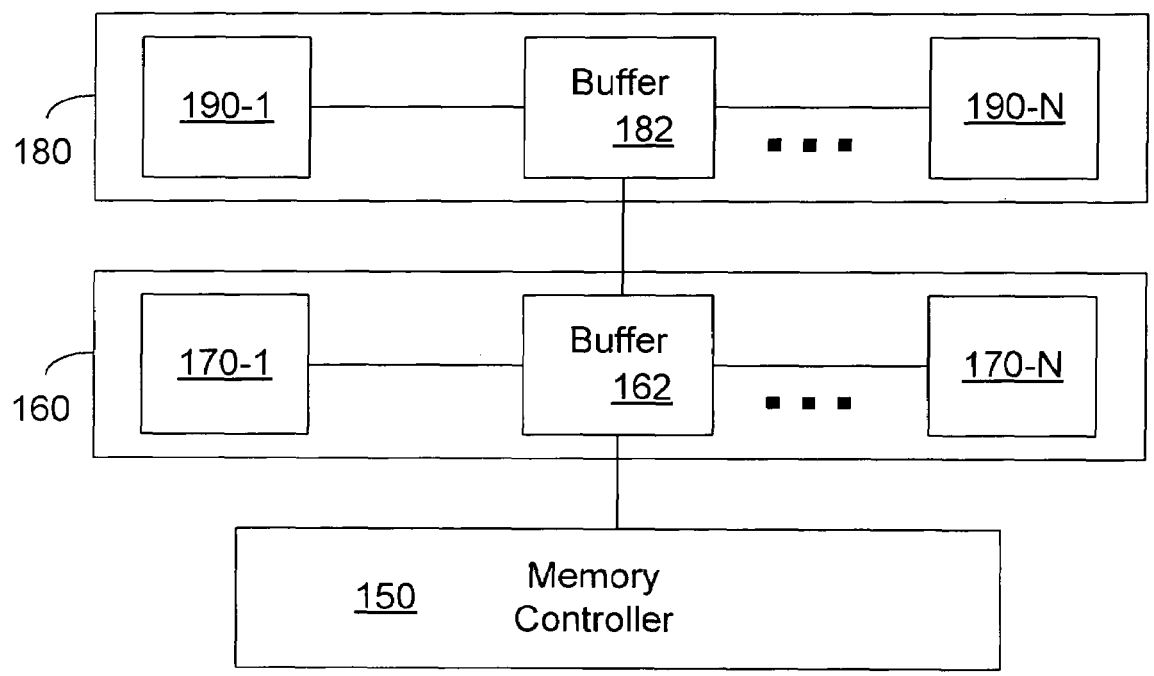

FIG. 10 illustrates a system in which memory devices 170-1 . . . 170-N are on a memory module substrate 160 and memory devices 190-1 . . . 190-N are on a memory module substrate 180. Each of these memory devices may be identical to or different than memory device 14. A memory controller 150 may be identical to or different than memory controller 12. In some embodiments, memory controller 150 and memory devices 170-1 . . . 170-N communicate through buffer 162 and memory controller 150 and memory devices 190-1 . . . 190-N communicate through buffers 162 and 182. In such a buffered system, the memory controller can use different signaling with the buffer than the buffer uses with the memory devices. Some embodiments may include additional conductors not shown in FIG. 10.

FIG. 11 illustrates first and second channels 206 and 216 coupled to a memory controller 202, which may be identical to or different than memory controller 12. Channels 206 and 216 are coupled to memory modules 208 and 218, respectively, that include memory devices such as are described herein.

In FIG. 12, a memory controller 252 (which represents any of previously mentioned memory controllers) is included in a chip 250, which also includes one or more processor cores 254. An input/output controller chip 256 is coupled to chip 250 and is also coupled to a wireless transmitter circuitry and wireless receiver circuitry 258. In FIG. 13, memory controller 252 is included in a hub chip 274. Hub chip 274 is coupled between a chip 270 (which includes one or more processor cores 272) and an input/output controller chip 278. Input/output controller chip 278 is coupled to wireless transmitter circuitry and wireless receiver circuitry 258.

Additional Information and Embodiments

The inventions are not limited to the interconnections between chips illustrated in FIG. 1. In an alternative system, memory controller 12 is coupled to memory device 14 through link 18, but link 20 is coupled to a next memory device (for example, like memory device 130-1 in FIG. 9) instead of to memory controller 12. The read data are provided to memory controller 12 through other conductors (such as 128-1 in FIG. 9.) Still other arrangements may be used.

There may be single or consolidated commands in addition to those described herein. In some embodiments, there may be some consolidated commands (not specifically described in this disclosure) that occur in both the first or second modes. There may be some consolidated commands (not specifically described in this disclosure) that are translated into three single commands.

The inventions are not restricted to any particular signaling techniques or protocols. For example, the signaling may be single ended or differential. The signaling may include only two voltage levels or more than two voltage levels. The signaling may be single data rate, double data rate, quad data rate, or octal data. The signaling may involve encoded symbols and/or packetized signals. A clock (or strobe) signal may be transmitted separately from the signals or embedded in the signals. Various coding techniques may be used. The inventions are not restricted to a particular type of transmitters and receivers. Various clocking techniques could be used in the transmitters and receivers and other circuits. The receiver symbols in the figures may include both the initial receiving circuits and related latching and clocking circuits. The conductors between chips each could be point-to-point or each could be in a multi-drop arrangement, or some could be point-to-point while others are a multi-drop arrangement.

In the figures showing one or more modules, there may be one or more additional modules in parallel and/or in series with the shown modules.

In actual implementations of the systems of the figures, there would be additional circuitry, control lines, and perhaps interconnects which are not illustrated. When the figures show two blocks connected through conductors, there may be intermediate circuitry that is not illustrated. The shape and relative sizes of the blocks is not intended to relate to actual shapes and relative sizes.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances of "an embodiment," "one embodiment," or "some embodiments" are not necessarily all referring to the same embodiments.

When it is said the element "A" is coupled to element "B," element A may be directly coupled to element B or be indirectly coupled through, for example, element C.

When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B."

If the specification states a component, feature, structure, process, or characteristic "may", "might", or "could" be included, that particular component, feature, structure, process, or characteristic is not required to be included. If the specification or claim refers to "a" or "an" element, that does not mean there is only one of the element.

The inventions are not restricted to the particular details described herein. Indeed, many other variations of the foregoing description and drawings may be made within the scope of the present inventions. Accordingly, it is the following claims including any amendments thereto that define the scope of the inventions.

What is claimed is:

1. A chip comprising:
 a request queue to include write requests;
 scheduling circuitry to schedule commands including commands in response to the write requests; and
 mode selection circuitry to monitor the request queue and in response thereto to select a first or a second mode for the scheduling circuitry, wherein in the first mode the scheduling circuitry schedules certain commands as separate single commands and in the second mode the scheduling circuitry schedules consolidated commands, wherein a read command without a preceding activate command is not consolidated whether the scheduling circuitry is in the first or second mode.

2. The chip of claim 1, wherein the consolidated commands include an activate/read command that represents separate signal commands activate and read, and the consolidated commands include an activate/write command that represents separate signal commands activate and write.

3. The chip of claim 1, wherein a precharge command is not consolidated whether the scheduling circuitry is in the first or second mode.

4. The chip of claim 1, wherein the monitoring involves determining whether a number of write requests in the request queue has a first or a second relationship to a threshold, and if the number has a first relationship to the threshold, then the mode selection circuitry selects the first mode, and if the number has a second relationship to the threshold, then the mode selection circuitry selects the second mode.

5. The chip of claim 1, wherein the first relationship is less than and the second relationship is greater than or equal to.

6. The chip of claim 1, wherein the first relationship is less than or equal to and the second relationship is greater than.

7. The chip of claim 1, wherein the mode selection circuitry switches from the first mode to the second mode in response to a first threshold being crossed and from the second mode to the first mode in response to a second threshold being crossed.

8. The chip of claim 1, wherein the monitoring involves giving different weight to write requests depending on whether they will involve a page miss or a page hit.

9. The chip of claim 1, wherein if the scheduling circuitry is in the first mode and the mode selection circuitry selects the first mode, then the scheduling circuitry remains unchanged.

10. The chip of claim 1, wherein if the scheduling circuitry is in the first mode and the mode selection circuitry selects the second mode, then the scheduling circuitry is switched from the first mode to the second mode.

11. The chip of claim 1, wherein if the scheduling circuitry is in the second mode and the mode selection circuitry selects the first mode, then the scheduling circuitry is switched from the second mode to the first mode.

12. The chip of claim 1, wherein in the first mode, the scheduling circuitry performs just in time scheduling.

13. The chip of claim 1, wherein the scheduling circuitry is by default in the first mode and the mode selection circuitry provides a signal to change the scheduling circuitry to the second mode.

14. The chip of claim 1, wherein the request queue is a write request queue and the chip further includes a read request queue.

15. A system comprising:
a first chip including:
a request queue to write requests;
scheduling circuitry to schedule commands including commands in response to the write requests;
mode selection circuitry to monitor the request queue and in response thereto to select a first or a second mode for the scheduling circuitry, wherein in the first mode the scheduling circuitry schedules certain commands as separate single commands and in the second mode the scheduling circuitry schedules consolidated commands, wherein each of the consolidated commands is a command that represents more than one separate single command, wherein a read command without a preceding activate command is not consolidated whether the scheduling circuitry is in the first or second mode; and
transmitters to transmit the scheduled commands;
a link coupled to the transmitters;
a second chip including:
receivers coupled to the link to receive signals including the scheduled commands;
command processing circuitry to translate the consolidated commands into separate single commands, wherein the consolidated commands are each a command that represents more than one separate single commands; and
a memory core to receive the separate single commands.

16. The system of claim 15, wherein the certain commands include activate and read commands which are consolidated into an activate/read command, and the certain commands include activate and write commands which are consolidated into an activate/write command.

17. The system of claim 15, wherein a precharge command is not consolidated whether the scheduling circuitry is in the first or second mode.

18. The system of claim 15, wherein the monitoring involves determining whether a number of write requests in the request queue has a first or a second relationship to a threshold, and if the number has a first relationship to the threshold, then the mode selection circuitry selects the first mode, and if the number has a second relationship to the threshold, then the mode selection circuitry selects the second mode.

19. The system of claim 15, wherein if the scheduling circuitry is in the first mode and the mode selection circuitry selects the first mode, then the scheduling circuitry remains unchanged.

20. The system of claim 15, further comprising a buffer chip and the receivers coupled to the link through the buffer chip.

21. The system of claim 15, wherein the first chip includes at least one processor core.

22. The system of claim 15, wherein the first chip is coupled to wireless transmitter circuitry and wireless receiver circuitry.

* * * * *